(12) United States Patent
Besier et al.

(10) Patent No.: US 10,988,124 B2
(45) Date of Patent: Apr. 27, 2021

(54) BRAKE SYSTEM HAVING TWO PRESSURE-PROVIDING DEVICES AND METHOD FOR OPERATING A BRAKE SYSTEM

(71) Applicant: Continental Teves AG & Co. oHG, Frankfurt (DE)

(72) Inventors: Marco Besier, Bad Schwalbach (DE); Peter Stauder, Mainz (DE); Johann Jungbecker, Badenheim (DE); Stefan Drumm, Saulheim (DE); Georg Roll, Frankfurt (DE); Jürgen Böhm, Obermeisen (DE); Paul Linhoff, Neu-Anspach (DE)

(73) Assignee: Continental Teves AG & Co. oHG

( * ) Notice: Subject to any disclaimer, the term of this patent is extended or adjusted under 35 U.S.C. 154(b) by 0 days.

(21) Appl. No.: 16/071,701

(22) PCT Filed: Mar. 1, 2017

(86) PCT No.: PCT/EP2017/054683
§ 371 (c)(1),
(2) Date: Jul. 20, 2018

(87) PCT Pub. No.: WO2017/148968
PCT Pub. Date: Sep. 8, 2017

(65) Prior Publication Data
US 2019/0031165 A1    Jan. 31, 2019

(30) Foreign Application Priority Data

Mar. 4, 2016    (DE) .................... 10 2016 203 563.0

(51) Int. Cl.
*B60T 8/40*    (2006.01)
*B60T 8/92*    (2006.01)
(Continued)

(52) U.S. Cl.
CPC ................. *B60T 8/92* (2013.01); *B60T 7/042* (2013.01); *B60T 8/348* (2013.01); *B60T 8/4081* (2013.01);
(Continued)

(58) Field of Classification Search
CPC . B60T 13/745; B60T 8/88; B60T 8/94; B60T 2270/402
See application file for complete search history.

(56) References Cited

U.S. PATENT DOCUMENTS 6,860,569 B1 * 3/2005 Campau ................ B60T 8/4081
303/11
9,315,180 B2    4/2016 Jungbecker et al.
(Continued)

FOREIGN PATENT DOCUMENTS

CN    102481914 A    5/2012
CN    102602384 A    7/2012
(Continued)

OTHER PUBLICATIONS

German Search Report for German Application No. 10 2016 203 563.0, dated Nov. 2, 2016, with partial translation—8 pages.
(Continued)

*Primary Examiner* — Bradley T King
(74) *Attorney, Agent, or Firm* — RatnerPrestia

(57) ABSTRACT

A brake installation for a motor vehicle. First and second pressure provision devices build up brake pressure in the wheel brakes. The first pressure device connected to a first wheel brake of a first brake circuit and to a second wheel brake of the first brake circuit. The second pressure device connected to a third wheel brake of a second brake circuit and to a fourth wheel brake of the second brake circuit. Each pressure device is respectively activated by an open-loop/closed-loop control unit. A first hydraulic line, with a
(Continued)

normally open isolating valve, connects the first wheel brake line of the first brake circuit to the first wheel brake line of the second brake circuit. A second hydraulic line, with a normally open isolating valve, connects the second wheel brake line of the first brake circuit to the second wheel brake line of the second brake circuit.

16 Claims, 7 Drawing Sheets

(51) Int. Cl.
    *B60T 8/34*     (2006.01)
    *B60T 7/04*     (2006.01)
    *B60T 8/88*     (2006.01)
    *B60T 11/20*     (2006.01)
    *B60T 13/58*     (2006.01)
    *B60T 13/68*     (2006.01)
    *B60T 8/32*     (2006.01)
    *B60T 8/36*     (2006.01)

(52) U.S. Cl.
    CPC .............. *B60T 8/885* (2013.01); *B60T 11/20* (2013.01); *B60T 13/58* (2013.01); *B60T 13/686* (2013.01); *B60T 8/326* (2013.01); *B60T 8/3645* (2013.01); *B60T 2270/402* (2013.01); *B60T 2270/404* (2013.01); *B60T 2270/82* (2013.01)

(56) References Cited

U.S. PATENT DOCUMENTS

| | | | |
|---|---|---|---|
| 9,637,102 | B2 | 5/2017 | Drumm et al. |
| 2002/0050739 | A1* | 5/2002 | Koepff .................... B60T 8/326 303/122.09 |
| 2007/0194622 | A1 | 8/2007 | Nakazawa et al. |
| 2011/0248558 | A1* | 10/2011 | Vollert ...................... B60T 1/10 303/3 |
| 2014/0028083 | A1* | 1/2014 | Gerdes ...................... B60T 1/10 303/6.01 |
| 2014/0152085 | A1* | 6/2014 | Biller .................... B60T 8/4081 303/10 |
| 2016/0009267 | A1* | 1/2016 | Lesinski, Jr. ........... B60T 8/885 303/10 |
| 2016/0167632 | A1* | 6/2016 | Deng ..................... B60T 7/042 701/70 |
| 2019/0308601 | A1* | 10/2019 | Maj .......................... B60T 8/326 |
| 2019/0322261 | A1* | 10/2019 | Hienz ........................ B60T 7/12 |
| 2020/0148183 | A1* | 5/2020 | Brok ...................... B60T 17/221 |
| 2020/0276963 | A1* | 9/2020 | Zimmermann ....... B60T 13/686 |

FOREIGN PATENT DOCUMENTS

| | | |
|---|---|---|
| CN | 103552556 A | 2/2014 |
| DE | 10319338 A1 | 11/2004 |
| DE | 102011108297 A1 | 8/2012 |
| DE | 102012202645 A1 | 10/2012 |
| DE | 102011122776 A1 | 1/2013 |
| DE | 102013217954 A1 | 3/2015 |
| JP | 2007216850 A | 8/2007 |

OTHER PUBLICATIONS

International Search Report and Written Opinion for International Application No. PCT/EP2017/054683, dated May 8, 2017—14 pages.
Korean Grant of Patent for Korean Application No. 10-2018-7024259, dated Jan. 30, 2020, with translation, 4 pages.
Chinese Office Action for Chinese Application No. 201780010464.2, dated May 27, 2020, with translation, 15 pages.

\* cited by examiner

BRAKE SYSTEM HAVING TWO PRESSURE-PROVIDING DEVICES AND METHOD FOR OPERATING A BRAKE SYSTEM

CROSS REFERENCE TO RELATED APPLICATIONS

This application is the U.S. National Phase application of PCT International Application No. PCT/EP2017/054683, filed Mar. 1, 2017, which claims priority to German Patent Application No. 10 2016 203 563.0, filed Mar. 4, 2016, the contents of such applications being incorporated by reference herein.

FIELD OF THE INVENTION

The invention relates to a brake installation for a motor vehicle, having four hydraulic wheel brakes which are assigned in each case to one vehicle wheel, having a brake pedal, which is assigned a travel sensor arrangement for identifying a braking demand, and having a first and a second pressure provision device for building up brake pressure in the wheel brakes, wherein the first pressure provision device is hydraulically connected via a wheel brake line to a first wheel brake assigned to a first brake circuit and is hydraulically connected via a wheel brake line to a second wheel brake assigned to the first brake circuit, and wherein the second pressure provision device is hydraulically connected via a wheel brake line to a first third wheel brake assigned to a second brake circuit and is hydraulically connected via a wheel brake line to a fourth wheel brake assigned to the second brake circuit, wherein each pressure provision device is respectively activated by an open-loop and closed-loop control unit. The invention furthermore relates to a method for operating a brake installation.

BACKGROUND OF THE INVENTION

A brake installation of said type, which can be operated in a "brake-by-wire" operating mode, wherein pressure can be actively built up in the brake circuits on the basis of a driver braking demand detection and in which two brake pressure generators connected hydraulically in parallel are provided, is known from DE 10 2013 217 954 A1, incorporated by reference herein, in the case of which wheel brakes can be supplied with brake fluid by two pressure provision devices. In a normal operating mode, brake pressure is built up in in each case one of two brake circuits exclusively by in each case one pressure provision device. In the event of failure of one of the two pressure provision devices, a circuit isolating valve is switched such that brake pressure can be built up in all of the wheel brakes by the pressure provision device that remains functional.

Brake systems are known in which a regular master brake system performs the build-up of system pressure during normal braking operation and an auxiliary brake system is available for the situation in which the system pressure provision function of the master brake system has failed. In this situation, the auxiliary brake system performs the build-up of pressure.

SUMMARY OF THE INVENTION

An aspect of the invention is aimed at designing a brake installation of said type to be flexible in terms of its brake pressure build-up capabilities. It is furthermore sought to specify a method for operating a brake installation of said type.

With regard to the brake installation, an aspect according to the invention comprises a first hydraulic connecting line, into which an isolating valve which is open when electrically deenergized is connected, connects a first wheel brake line of the first brake circuit to a first wheel brake line of the second brake circuit, and in that a second hydraulic connecting line, into which an isolating valve which is open when electrically deenergized is connected, connects a second wheel brake line of the first brake circuit to a second wheel brake line of the second brake circuit.

An aspect of the invention is based on the consideration that it is desirable for brake pressure to be built up in a precise and controlled manner in both brake circuits of a brake installation. In particular in the case of vehicles with a recuperation brake (purely electric vehicles (FEL) or hybrid vehicles), but also in the case of vehicles powered by an internal combustion engine, it is additionally desirable to be able to set different brake pressures in the two brake circuits by means of so-called blending.

In the case of active brake systems, this is normally realized by virtue of a pressure provision device providing an initial pressure, and the respectively demanded pressure being set by means of isolating valves, which connect the pressure provision device to or separate the pressure provision device from the brake circuits, and/or by means of the inlet and outlet valves assigned to the respective brake.

As has now been identified, a brake system in which not only one but two separate pressure provision devices or brake pressure generators are provided can not only provide redundancy for the active build-up of pressure. It can rather also be utilized for generating respectively different brake pressures in the two brake circuits. Here, during normal operation, one of the two brake pressure provision devices builds up pressure in one of the two brake circuits, whereas the other brake pressure provision device builds up brake pressure in the other brake circuit. By contrast, if one of the two pressure provision devices fails, then it is possible, by means of a suitable hydraulic circuit configuration, for pressure to continue to be built up in a wheel-specific manner in all of the wheel brakes by the other pressure provision device.

These abovementioned operating modes can be achieved through the use of hydraulic connecting lines, which permit the flow of brake medium from one wheel brake line to a further wheel brake line, and a hydraulic isolation, in accordance with demand, of the failed pressure provision device with respect to the wheel brakes, and the targeted isolation of said connecting lines by means of isolating valves. Redundancy may also be realized, though this comes to bear only if one of the two brake pressure generators or pressure provision devices fails.

In the context of the present application, a brake circuit refers to a hydraulic circuit which is connected to a hydraulic pressure chamber, which may comprise one or two pressure spaces, of a pressure provision device.

In a preferred embodiment, in a normal operating mode, both pressure provision devices build up brake pressure, wherein at least one open-loop and closed-loop control unit switches the isolating valves into their isolating position, such that in each case one pressure provision device builds up pressure in the wheel brakes of exactly one brake circuit. Each of the two brake circuits is thus served by exactly one pressure provision device. A fast and targeted build-up of pressure in the wheel brakes of a brake circuit is thus possible. This is advantageous in particular in a black/white distribution of the brake circuits, in which the two front-wheel brakes are assigned to one brake circuit and the two rear-wheel brakes are assigned to a further brake circuit, because then, owing to the dynamic axle load shift during a braking operation, the brake pressure can be metered in an optimized manner.

Into the respective wheel brake line there is advantageously connected in each case one wheel valve which is open when electrically deenergized and which is opened by at least one open-loop and closed-loop control unit for the purposes of a wheel-specific build-up of pressure in the respective wheel brake. For multiplexing, the individual wheel valves are opened and closed in order to set the desired brake pressure in a wheel-specific manner in accordance with demand.

In each case one sequence valve which is closed when electrically deenergized is preferably connected into the respective wheel brake line. Said valve serves for the isolation, in accordance with demand, of the pressure provision device with respect to the respective wheel brake, or the interconnection thereof, if it is intended for the pressure provision device to build up pressure in the wheel brake.

In the event of a failure of a pressure provision device, the sequence valves in the wheel brake lines by means of which the failed pressure provision device is connected to the wheel brakes switch, preferably in an electrically deenergized state, into their isolating position.

In a first preferred variant, the respective pressure provision device has exactly one pressure space and one piston which is movable into said pressure space for the purposes of building up pressure.

In a second preferred variant, the respective pressure provision device has two pressure chambers, wherein the first pressure chamber is hydraulically connected or connectable to a wheel brake of the first brake circuit, and the second pressure chamber is hydraulically connected or connectable to a wheel brake of the same brake circuit. The respective pressure provision device thus preferably has two pressure chambers, wherein each of the two pressure chambers is hydraulically connected or connectable to a different brake of the same brake circuit.

In relation to the second described variant, the first variant has the advantage that fewer components are required, and the construction of the pressure provision device is simpler than in the second case. In the case of the brake installation proposed here as per the first variant, a two-circuit configuration is also realized.

In the normal operating mode, it is preferable for each brake circuit to be assigned two wheel brakes which impart a braking action on the same vehicle axle, whereby the dynamic axle load shift can be taken into consideration in a precise manner in the activation of the pressure provision devices.

An actuation apparatus is preferably provided, which is hydraulically connectable to the wheel brakes and by means of which the driver can build up pressure in the wheel brakes when he or she actuates the brake pedal by muscle force. The actuation unit is advantageously formed as a tandem master brake cylinder.

With regard to the method, the above-stated object is achieved according to an aspect of the invention in that, in the normal situation, when pressure can be built up by both pressure provision devices, pressure is built up in the two wheel brakes assigned to one brake circuit by in each case one of the two pressure provision devices.

In the event of failure of exactly one pressure provision device, said pressure provision device is preferably isolated from the wheel brakes in which it builds up pressure in the normal situation, wherein a connection is hydraulically produced between at least one wheel brake line which is connected to the pressure provision device that has not failed and a wheel brake isolated with respect to the pressure provision device, such that the pressure provision device that remains functional can build up pressure in said wheel brakes.

In the event of failure of both pressure provision devices, it is advantageously the case that both pressure provision devices are in each case hydraulically isolated from the wheel brakes, wherein, in this case, an actuation unit actuatable by means of a brake pedal is hydraulically connected to the wheel brakes, with the aid of which actuation unit the driver can displace brake fluid into the wheel brakes by actuating the brake pedal.

The advantages of an aspect of the invention lie in particular in the fact that, through the use of the pressure provision device that is still intact, in the event of failure of the other pressure provision device, an additional fall-back level is provided, in which wheel-specific brake pressure control of all four wheel brakes remains possible. This means that not only a redundant by-wire normal braking function but also redundant ABS functionality are provided. This functionality is available both to the driver and to other brake control functions. By means of the additional fall-back level with a pressure provision device, the pedal characteristic does not change, whereby irritation of the driver is avoided.

In the event of failure of both pressure provision devices, a further fall-back level is additionally available, in which the driver displaces brake fluid into the wheel brakes by muscle force. By means of the redundant by-wire braking function and the redundant wheel-specific brake pressure control for all four wheel brakes, the brake system according to an aspect of the invention is ideally suited to use for highly automated driving, because it provides the full scope of the required redundancy.

By means of hydraulic circuit configuration according to an aspect of the invention, the distribution in the normal operating mode and that in the fall-back level can be selected to differ, such that the advantageous distribution (by axle in the normal situation, diagonally in the fall-back level) can be used in each case.

BRIEF DESCRIPTION OF THE DRAWINGS

An exemplary embodiment of an aspect of the invention will be discussed in more detail on the basis of a drawing. In the drawing, in a highly schematic illustration.

DETAILED DESCRIPTION OF THE PREFERRED EMBODIMENTS

In all of the figures, identical parts are denoted by the same reference designations.

Figure 1:
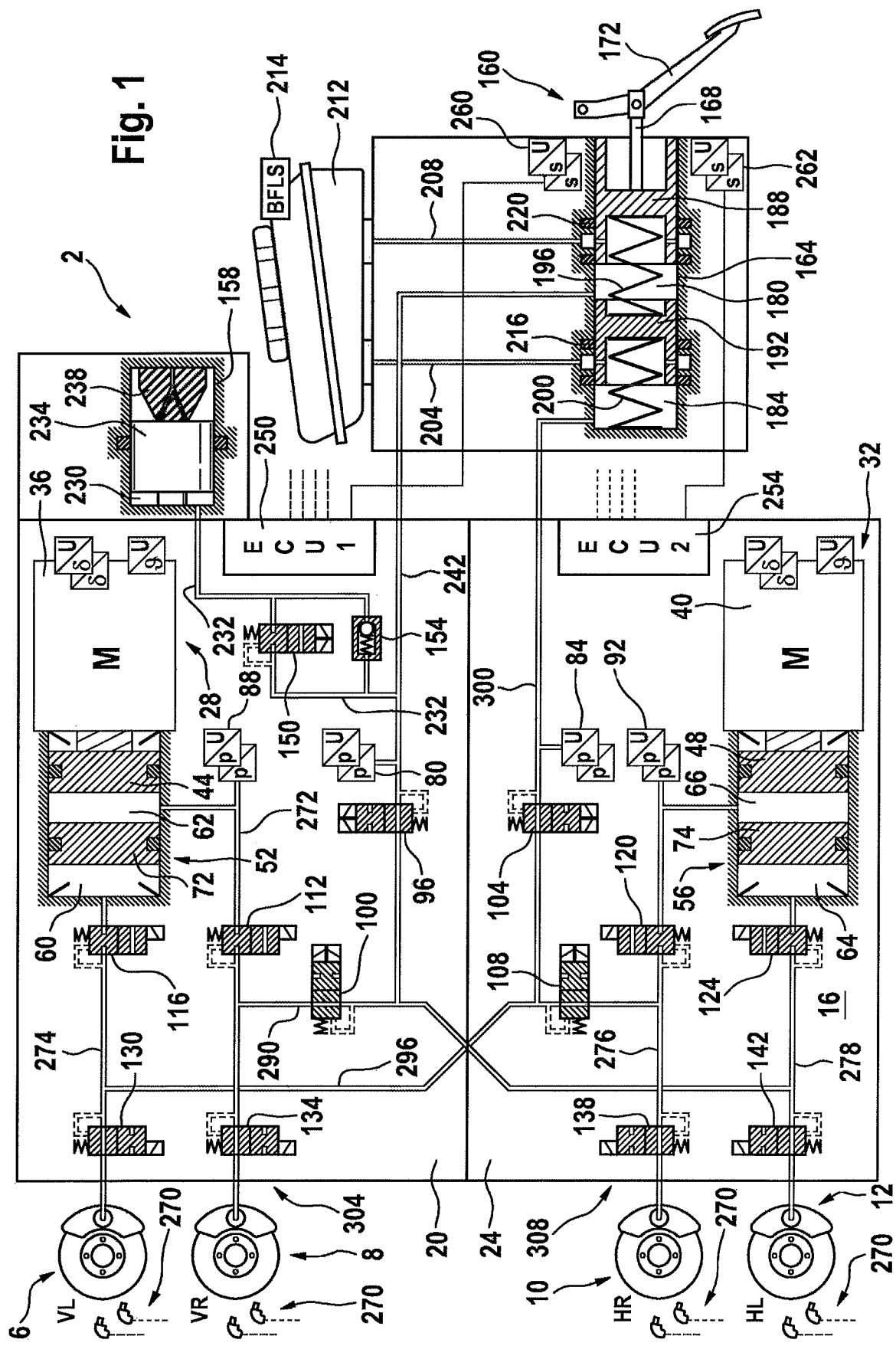
FIG. 1 shows a hydraulic circuit diagram of a brake installation having two pressure provision devices in a preferred embodiment, in the electrically deenergized state.

A brake installation 2 illustrated in FIG. 1 has four hydraulic wheel brakes 6, 8, 10, 12, wherein, in the present case, wheel brake 6 is assigned to the left-hand front wheel, wheel brake 8 is assigned to the right-hand front wheel, wheel brake 10 is assigned to the right-hand rear wheel, and wheel brake 12 is assigned to the left-hand rear wheel. The brake installation 2 has a hydraulic unit 16 which is divided into a first sub-module 20 and a second sub-module 24. Each of the two sub-modules 20, 24 has in each case one pressure provision device 28, 32. Said pressure provision device is formed in each case as an electrohydraulic actuator with an electric motor 36, 40, with an optional rotation-rotation mechanism stage (preferably with a toothed belt; not illustrated) and with a rotation-translation mechanism (not illustrated), which converts the rotation of the motor shaft into a translational or axial movement. The rotation-translation mechanism is preferably formed in each case as a ball screw drive.

The respective pressure provision device 28, 32 furthermore has in each case one hydraulic piston 44, 48, which is displaceable by means of the electric motor 36, 40. The pressure provision device 28, 32 has in each case one pressure chamber 52, 56, into which the hydraulic piston 44, 48 is in each case displaceable. A displacement of the hydraulic piston 44, 48 into the respective pressure chamber 52, 56 is realized by means of an actuation of the electric motor 36, 40, wherein the rotation of the motor shaft is converted by means of the rotation-translation mechanism into the axial displacement of the respective hydraulic piston 44, 48.

In the respective pressure chamber 52, 56 there are formed in each case two pressure spaces 60, 62 and 64, 66 respectively, which are in each case separated from one another by a second hydraulic piston 72, 74, which is formed in each case as a floating piston.

A first brake circuit 304 is formed by virtue of pressure space 60 of the pressure chamber 52 being hydraulically connected to the wheel brake 6, and pressure space 62 of the pressure chamber 52 being hydraulically connected to the wheel brake 8. The two wheel brakes 6, 8 are thus hydraulically connected to the same pressure chamber 52, whereby a hydraulic circuit is formed which is referred to in the context of this application as brake circuit and may also be referred to as pressure provision circuit. The wheel brake 10 is hydraulically connected to the pressure space 66 of the pressure chamber 56, and the wheel brake 12 is connected to the pressure space 64 of the pressure chamber 56, whereby a second brake circuit 308 is formed.

Each of the two sub-modules 20, 24 is assigned in each case one pressure sensor 80, 84, by means of which the driver input pressure is measured, and a further pressure sensor 88, 92, by means of which the actuator or system pressure is measured. The sub-module 20 is assigned a first isolating valve 96 and a second isolating valve 100, and both isolating valves are open when electrically deenergized. The sub-module 24 is assigned a third isolating valve 104 and a fourth isolating valve 108, which are both open when electrically deenergized. The sub-module 20 is assigned a first sequence valve 112, which is closed when electrically deenergized, and a second sequence valve 116, which is closed when electrically deenergized; the sub-module 24 is assigned a third sequence valve 120, which is closed when electrically deenergized, and a fourth sequence valve 124, which is closed when electrically deenergized.

Each wheel brake 6, 8, 10, 12 is assigned in each case one wheel valve 130, 134, 138, 142 which is open when electrically deenergized and which, in the open state, permits the flow of brake fluid into the respective wheel brake 6-10 or permits the return flow thereof and, in the shut-off or closed state, hold the brake fluid in the respective wheel brake 6-10. Also arranged in the sub-module 20 is a simulator valve 150, which is closed when electrically deenergized, and a check valve 154, which is connected hydraulically in parallel with respect to said simulator valve. The sub-module 20 is furthermore assigned a pedal simulator 158.

The brake installation 2 has an actuation unit 160, comprising a tandem master brake cylinder 164, which can be actuated by means of a brake pedal 172 via a piston rod 168. The tandem master brake cylinder 164 has two pressure chambers 180, 184, into which in each case one pressure piston 188, 192 can be displaced. Arranged in the respective pressure chamber 180, 184 is in each case one elastic resetting element 196, 200, which is in the form of a spring and by means of which the pressure piston 188, 192 is in each case displaced back into its initial position when the brake pedal 172 is not actuated. The respective pressure chamber 180, 184 is in each case connected or connectable via a hydraulic line 204, 208 to a brake fluid reservoir tank 212. Sleeve seals 216, 220 shut off the hydraulic connection to the brake fluid reservoir tank 212 in the actuated state of the tandem master brake cylinder 164, and open up said hydraulic connection in the non-actuated state. The brake fluid reservoir tank 212 is equipped with a brake fluid level sensor 214.

The actuation unit 160 is preferably structurally separate from the hydraulic unit 16 and connected thereto by hydraulic lines and electrical sensor connections. The actuation unit 160 may, as in the case of conventional brake actuation means, be connected to the pedal and fastened in the conventional manner to the vehicle bulkhead between passenger compartment and engine bay.

The hydraulic unit with the sub-modules 20, 24 can, by means of a preferably structural separation, be arranged as desired in a suitable free space in the vehicle. This offers advantages inter alia for NVH (Noise, Vibration and Harshness) and a flexible integration into the vehicle package. In the case of an optimized arrangement of the hydraulic unit in the vehicle or in the engine bay and possibly optimized decoupling or damping, perceptible or disturbing noises of the actuators, such as valves or pressure generators, in the passenger compartment can be avoided.

The pedal simulator 158 has a hydraulic pressure space 230 into which, during normal operation of the brake installation in the by-wire operating mode, brake fluid from the pressure chamber 180 is displaced through a hydraulic simulator line 232 counter to a piston 234 and the force of an elastic simulator element 238. The simulator line 232 is hydraulically connected to a hydraulic line 242 which leads into the pressure chamber 180.

The sub-module 20 is assigned the wheel brakes 6, 8 of the front axle, wherein the wheel brake 6 imparts a braking action at the front left (VL), and the wheel brake 8 imparts a braking action at the front right (VR). The sub-module 24 is assigned the wheel brakes 10, 12 at the rear axle, wherein the wheel brake 10 imparts a braking action at the rear right (HR), and the wheel brake 12 imparts a braking action at the rear left (HL).

Each sub-module 20, 24 is assigned in each case one electronic open-loop and closed-loop control unit (ECU) 250, 254. The brake fluid level sensor 214 is connected to at least one of the two open-loop and closed-loop control units 250, 254 at a signal input side. In the actuation unit 160 there are arranged pedal travel sensors 260, 262, which are in each case connected to at least one of the ECUs. The pedal travel sensors 260, 262 are preferably each of redundant design.

Wheel rotational speed sensors 270, which are preferably of redundant design, are connected to at least one of the two ECUs at a signal input side. The wheel rotational speed sensors 270 are preferably each designed as a double sensor element in in each case one wheel sensor housing. This design makes it possible to maintain the conventional number of four mechanically installed wheel rotational speed sensor modules on the wheel carrier in motor vehicles, in particular passenger motor vehicles. It would alternatively also be possible for eight single standard wheel rotational speed sensors to be installed. The redundant wheel rotational speed sensor information items or signals are preferably assigned to each of the two ECUs, such that the wheel rotational speed information items are available to each ECU independently of the other.

In the normal by-wire operating mode, pressure is built up in the wheel brakes 6-10 by means of the two pressure provision devices 28, 32. For this purpose, a hydraulic wheel brake line 272, into which the first sequence valve 112 is connected, connects pressure space 62 to the wheel brake 8. A hydraulic wheel brake line 274, into which the second sequence valve 116 is connected, connects pressure space 60 to the wheel brake 6. A hydraulic wheel brake line 276, into which the third sequence valve 120 is connected, connects pressure space 66 to the wheel brake 10. A hydraulic wheel brake line 278, into which the fourth sequence valve 124 is connected, connects the pressure space 64 to the wheel brake 12.

A first hydraulic connecting line 290, into which the second isolating valve 100 is connected, connects the hydraulic lines 272 and 278. A second hydraulic connecting line 296, into which the fourth isolating valve 108 is connected, connects the hydraulic lines 274 and 276. A hydraulic line 300 connects pressure space 184 to the line 296.

In the example, a first hydraulic connecting line 290, into which an isolating valve 100 which is open when electrically deenergized is connected, connects one of the wheel brake lines (272) of the first brake circuit 304 to one of the wheel brake lines (278) of the second brake circuit 308, and a second hydraulic connecting line 296, into which an isolating valve 108 which is open when electrically deenergized is connected, connects the other wheel brake line 274 of the first brake circuit 304 to the other wheel brake line 276 of the second brake circuit 308.

Figure 2:
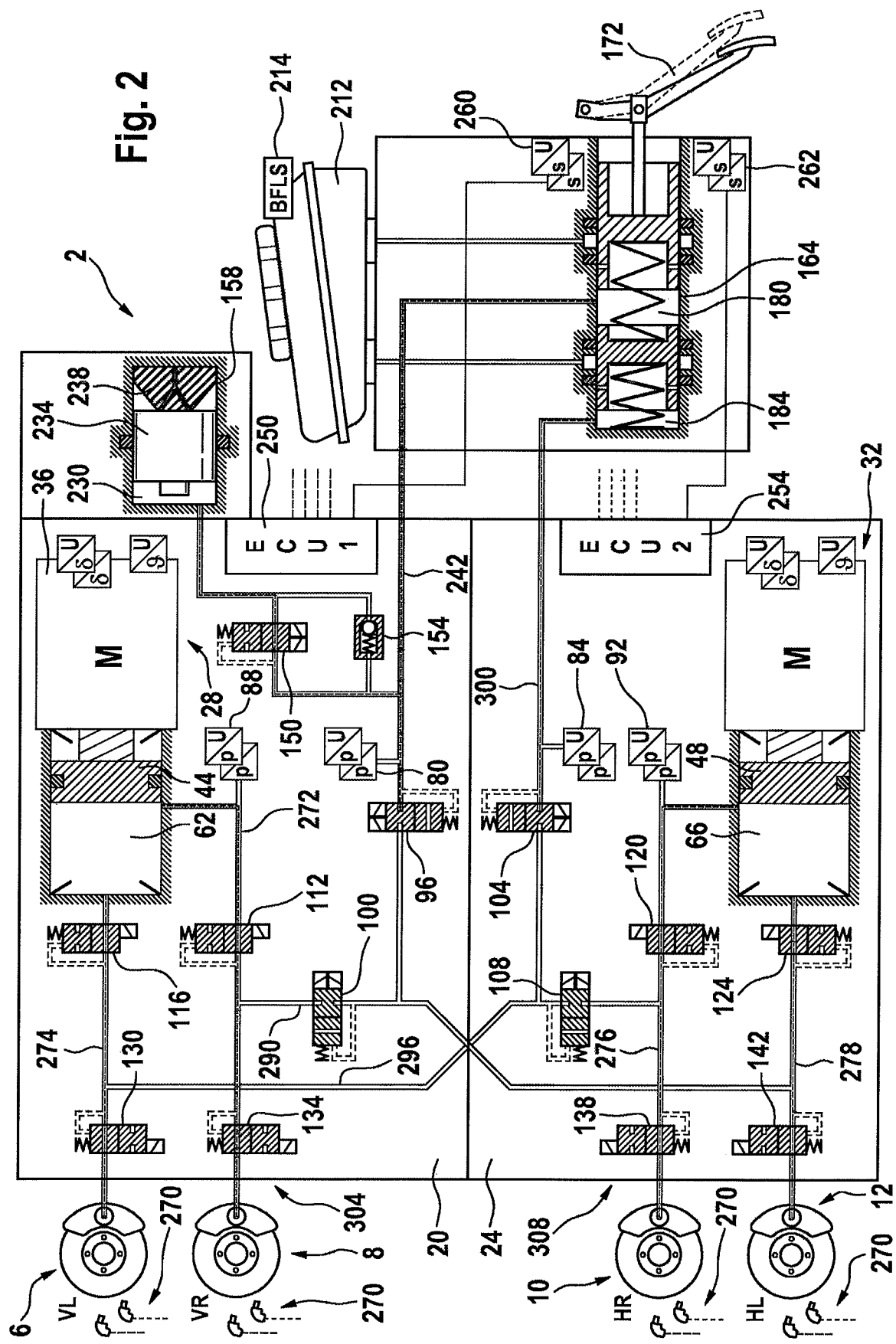
FIG. 2 shows a hydraulic circuit diagram of a brake installation having two pressure provision devices in a further preferred embodiment, in the hydraulic switching state of the by-wire normal operating mode.

A second preferred embodiment of a brake installation 2 is illustrated in FIG. 2 in the normal by-wire operating state. This embodiment differs from the embodiment illustrated in FIG. 1 in that the pressure provision devices 28, 32, which in this case, and in the variant illustrated in FIG. 1, are formed as linear actuators, only have in each case one pressure space 62, 66; a floating piston, by means of which a second pressure space is formed, is not present here. This embodiment offers the advantages of a small structural length and fewer components. In the embodiment with floating piston, the advantage of a hydraulic isolation of the wheel brake circuits with respect to one another is realized. This is however not imperatively necessary, because the brake system or the brake installation 2 is still of at least two-circuit configuration even without a floating piston.

In the normal brake-by-wire operating mode illustrated in FIG. 2, the isolating valves 96, 104 are each switched into their isolating position, such that the tandem master brake cylinder 164 is hydraulically isolated from the rest of the brake installation 2. The simulator valve 150 is switched into its pass-through position, such that the simulator 158 is hydraulically connected to the pressure chamber 180. When the brake pedal 172 is actuated, the driver displaces pressure medium out of the pressure chamber 180 into the pressure space 230 of the simulator 158, which generates a suitable force-travel characteristic of the brake pedal. The two isolating valves 100, 108 are switched into their isolating position. This results in a circuit division into a first brake circuit 304, which comprises the two wheel brakes 6, 8, and a second brake circuit 308, which comprises the two wheel brakes 10, 12.

The sequence valves 112, 116, 120, 124 are switched into their pass-through position and thus opened. The pressure provision device 28 is thus hydraulically connected to the wheel brakes 6, 8, and the pressure provision device 32 is connected to the wheel brakes 10, 12. The division of the brake circuits in this configuration is thus "black/white". By means of the pedal travel sensors 260, 262, the piston travel or brake pedal travel is detected and is processed in each case by the open-loop and closed-loop control units 250, 254.

The pressure sensors 80, 84 in each case detect the brake pressure generated by the driver, which is processed in the open-loop and closed-loop control units 250, 254. There, from the pressure and pedal travel information items, a driver braking demand is determined, which is predefined as a system setpoint pressure for the two brake circuits 304, 308. As an alternative to the determination of the braking demand, it is also possible for a system setpoint pressure to be generated in at least one ECU itself or by electrical transmission from the outside via a communication connection.

Said system setpoint pressure is converted by the electrohydraulic linear actuators or pressure provision devices 28, 32 into a hydraulic pressure, which acts on the wheel brakes 6-12 and generates the desired braking action. Said system pressure or brake circuit pressure is detected in each case by means of the pressure sensors 88, 92. Since, in the present case, in each case one pressure provision device 28, 32 is assigned to one axle or to the wheel brakes 6, 8 or 10, 12 respectively situated there, the brake pressure can be varied on an axle-by-axle basis.

By movement of the pistons of the pressure provision devices 28, 32, the brake pressure can be varied on an axle-by-axle basis in analog, continuously variable and quiet fashion. It is thus possible, in order to influence the driving characteristics of the vehicle, for the brake force distribution to be varied entirely freely on an axle-by-axle basis, for example in order to generate an ideal brake force distribution in accordance with the axle load shift during braking, or in order to correspondingly hydraulically compensate, and adapt in continuously variable fashion, any generator braking torque (during the course of recuperation in the case of a hybrid vehicle or an electric vehicle) acting at one or both axles.

Figure 3:
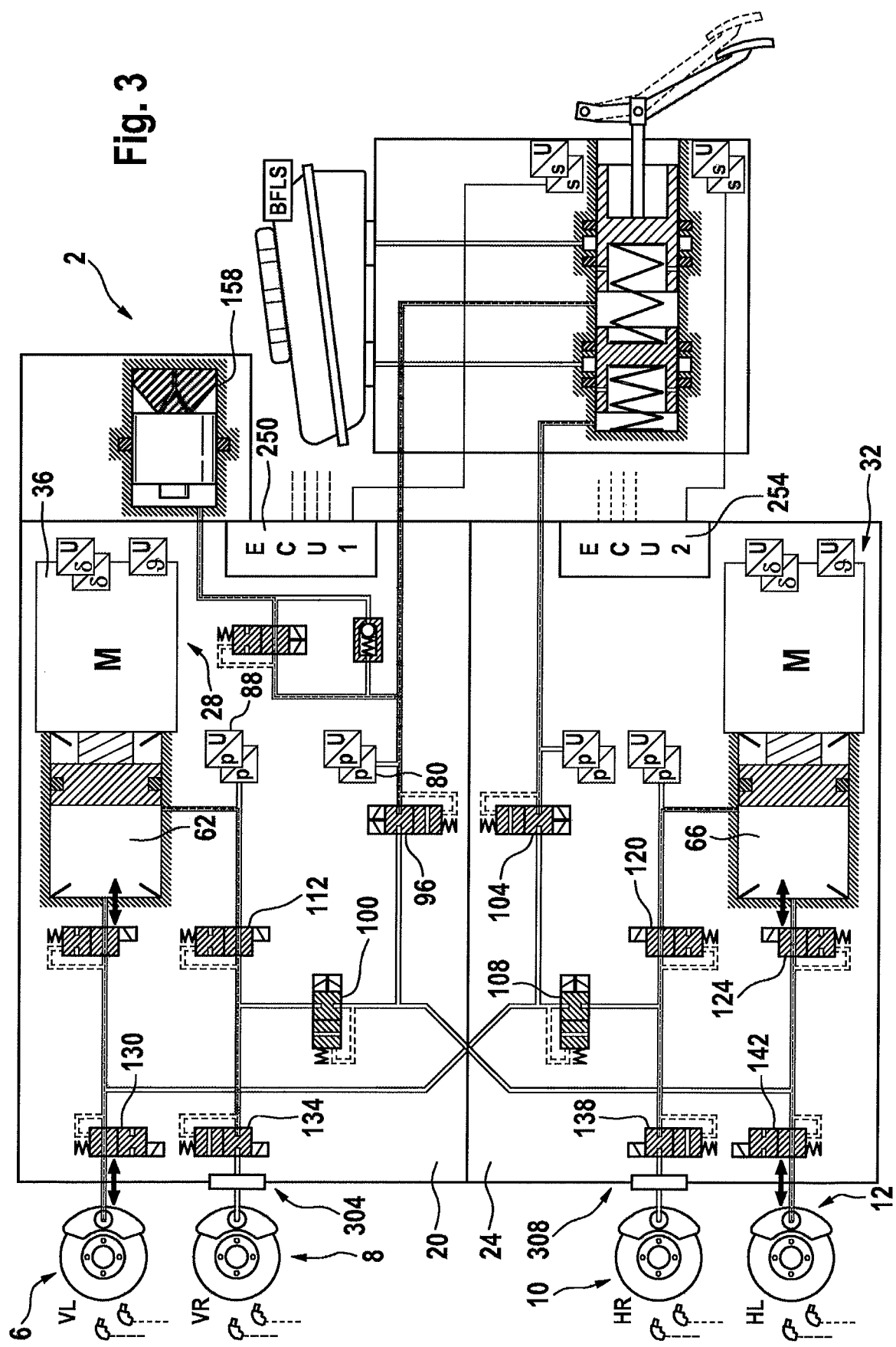
FIG. 3 shows the brake installation as per FIG. 2 during an exemplary wheel-specific brake pressure control operation.

FIG. 3 illustrates, by way of example, a wheel-specific pressure modulation in the case of the brake installation 2 as per FIG. 2. The wheel-specific pressure modulation is performed by means of the wheel valves 130, 134, 138, 142. For the wheel-specific pressure modulation, axle-by-axle multiplexing is used in the normal operating mode. This offers considerable functional advantages in relation to known systems, in the case of which a pressure provision device must operate all four or more wheel brakes by multiplexing, because, in the present case, fewer, that is to say only two, wheel brakes have to be served by each pressure provision device, wherein this is realized on an axle-by-axle basis. In this way, considerable time advantages arise in the sequential processing of the wheels or wheel brakes 6, 8, 10, 12 during the multiplexing. The greater the number of wheel brakes that have to be sequentially processed by one pressure provision device, the longer it takes to run through all of the wheel brakes, and the more problematic it is for the brake control functions to set the respective wheel brake pressure in a timely manner. In the worst case, the time delay of the sequential processing can even have an adverse effect on the vehicle behavior or the vehicle stability.

The axle-by-axle distribution is furthermore particularly advantageous because brake pressure modulation operations are also often necessary or performed on an axle-by-axle basis. Dominant pressure differences may often prevail on an axle-by-axle basis, wherein the pressure differences between left and right are then less pronounced, which may be caused for example by axle load shift or different brake pressure-braking torque ratios of the wheel brakes at the axles.

During the axle-by-axle multiplexing as illustrated in FIG. 3, by means of the wheel valves 130, 134, 138, 142 and corresponding volume displacement or pressure setting by means of the pressure provision devices 28, 32, the respectively open wheel valve 130, 134, 138, 142 is passed through by flow, and the desired wheel brake pressure is set there. Thus, in the case of different wheel target pressures at one axle, the wheel valve 130, 134, 138, 142 of the wheel brake 6, 8, 10, 12 in which the pressure is to be changed is opened, and the wheel valve 130, 134, 138, 142 of the other wheel brake 6, 8, 10, 12, in which the pressure is presently not to be changed, is closed. In this configuration, the pressure at the wheel brake with the open wheel valve is then set by the pressure provision device 28, 32. This is realized, for the purposes of building up pressure, by movement of the respective piston into the pressure chamber and, for the purposes of dissipating pressure, by opposite movement of the piston.

After the desired wheel pressure has been attained in the wheel brake 6, 8, 10, 12, the wheel valve 130, 134, 138, 142 is closed again, and the wheel valve 130, 134, 138, 142 of the other wheel brake 6, 8, 10, 12 is opened in order to set a changed target pressure there. Thus, in the present case, it is possible for the left-hand front wheel brake 6 and the right-hand front wheel brake 8 to be served by the pressure provision device 28, or for the pressure to be modulated, in alternating fashion. In the state illustrated in FIG. 3, the wheel valve 130 of the front left wheel brake 6 is open, and the wheel valve 134 of the right-hand front wheel brake 8 is closed, such that the pressure can be set in the wheel brake 6.

The right rear wheel brake 10 and the left rear wheel brake 12 are served by the pressure provision device 28. In the state shown here, the wheel valve 138 of the rear right brake 10 is closed, and the wheel valve 142 of the rear left wheel brake 12 is opened, such that the pressure can be set in the wheel brake 12 in accordance with demand.

In general, the wheel pressure modulation is performed sequentially with suitable alternation of the wheel brakes 6, 8 and 10, 12 at the respective axle. It is however also possible for targeted overlaps to be realized, in the case of which temporarily both wheel valves 130, 134 or 138, 142 at one axle are open, in order to generate suitable volume flows in order to achieve the target pressures.

In the event of failure of a sub-module 20, 24, for example owing to faults in the pressure provision device 28, 32, in the open-loop and closed-loop control unit 250, 254 and/or of the energy supply, the respective other, intact sub-module can maintain the by-wire braking function for the driver or other functions.

Figure 4:
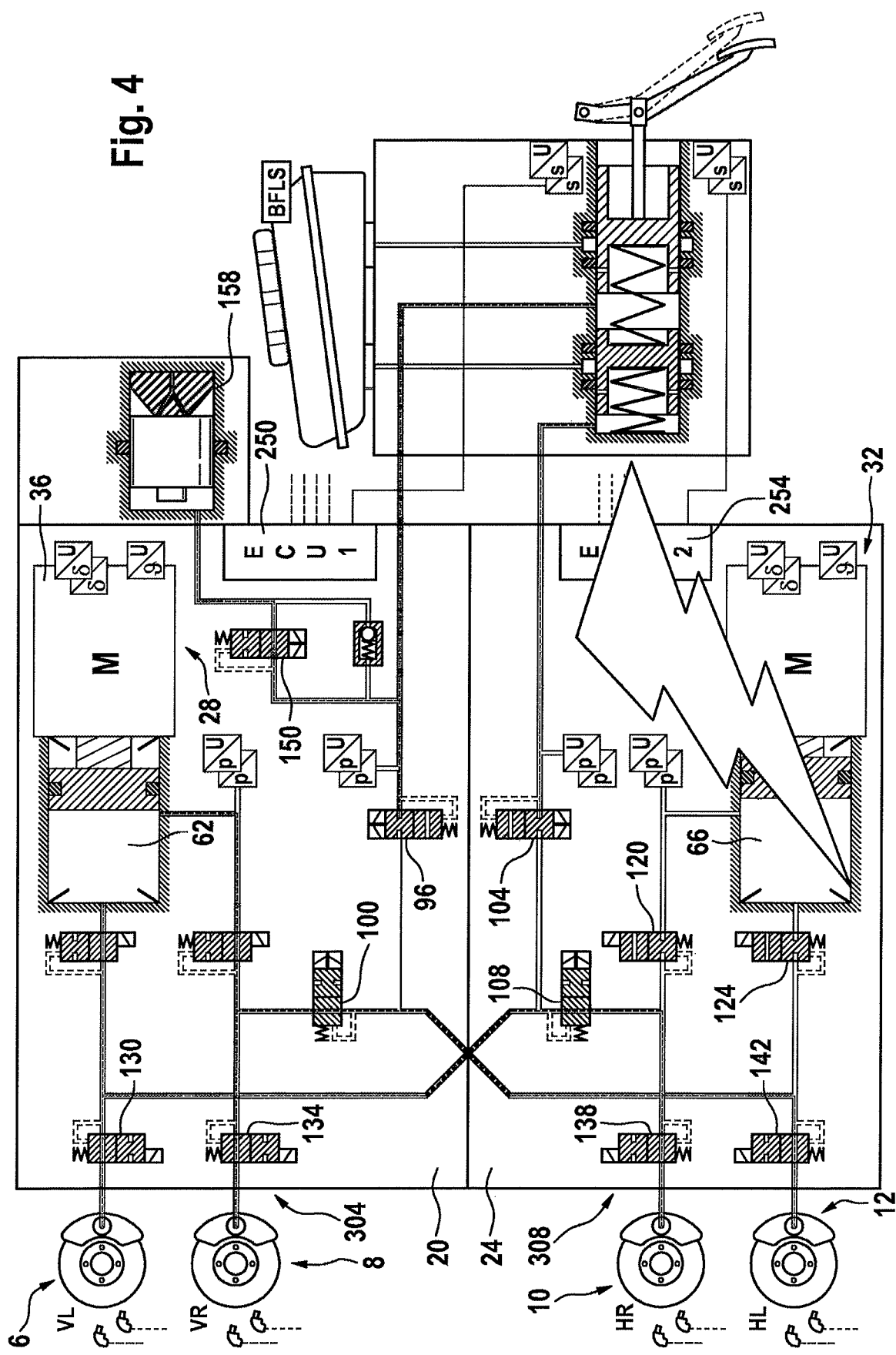
FIG. 4 shows the brake installation as per FIG. 2 in a first fall-back level in the event of failure of one of the two pressure provision devices.

FIG. 4 illustrates, by way of example, the failure of the sub-module 24. The sequence valves 120, 124 and the wheel valves 138, 142 pass, in an electrically deenergized state, into their initial position. In the case of the sequence valves 120, 124, this is closed when electrically deenergized, and in the case of the wheel valves 138, 142, this is open when electrically deenergized. The isolating valves 96, 100, 104, 108 and the simulator valve 150 are electrically connected to both open-loop and closed-loop control units 250, 254 and are thus independently electrically switchable by both ECUs. This means that each ECU individually can switch these valves, or both ECUs jointly switch the two valves together. This is preferably realized by means of a double coil winding for an electromagnetic valve, in the case of which two coil wires are wound jointly, which coil wires can thus be connected electrically independently to two ECUs. Thus, in the exemplary illustration as per FIG. 4, it remains possible for the four isolating valves 96, 100, 104, 108 and the simulator valve 150 to be electrically activated and switched, or to be switched into the normal by-wire switching position as illustrated, by the intact open-loop and closed-loop control unit 250.

There is thus also no irritation for the driver owing to influencing of the pedal characteristic, because the actuation unit 160 is hydraulically connected to the pedal simulator 158 as in the fault-free or normal by-wire brake operating mode. By means of the valve switching configuration shown in FIG. 4, it is furthermore possible for the brake pressure generated by the intact pressure provision device 36 to be conducted to all four wheel brakes 6, 8, 10, 12, and thus for the desired brake pressure or deceleration demand to be implemented by means of all four wheel brakes 6, 8, 10, 12.

By means of the brake installation 2, it is furthermore possible, in the event of failure of one sub-module 20, 24, for an ABS function or other wheel-specific brake control functions to be provided for all four wheel brakes 6, 8, 10, 12 by means of the respective other, intact sub-module 20, 24. In this way, it is for example possible for slip-controlled ABS braking on all four wheels to be performed despite a failure of a sub-module. This applies to braking operations actuated or initiated by the driver by means of the brake pedal and for brake control functions electrically activated in some other way.

Figure 5:
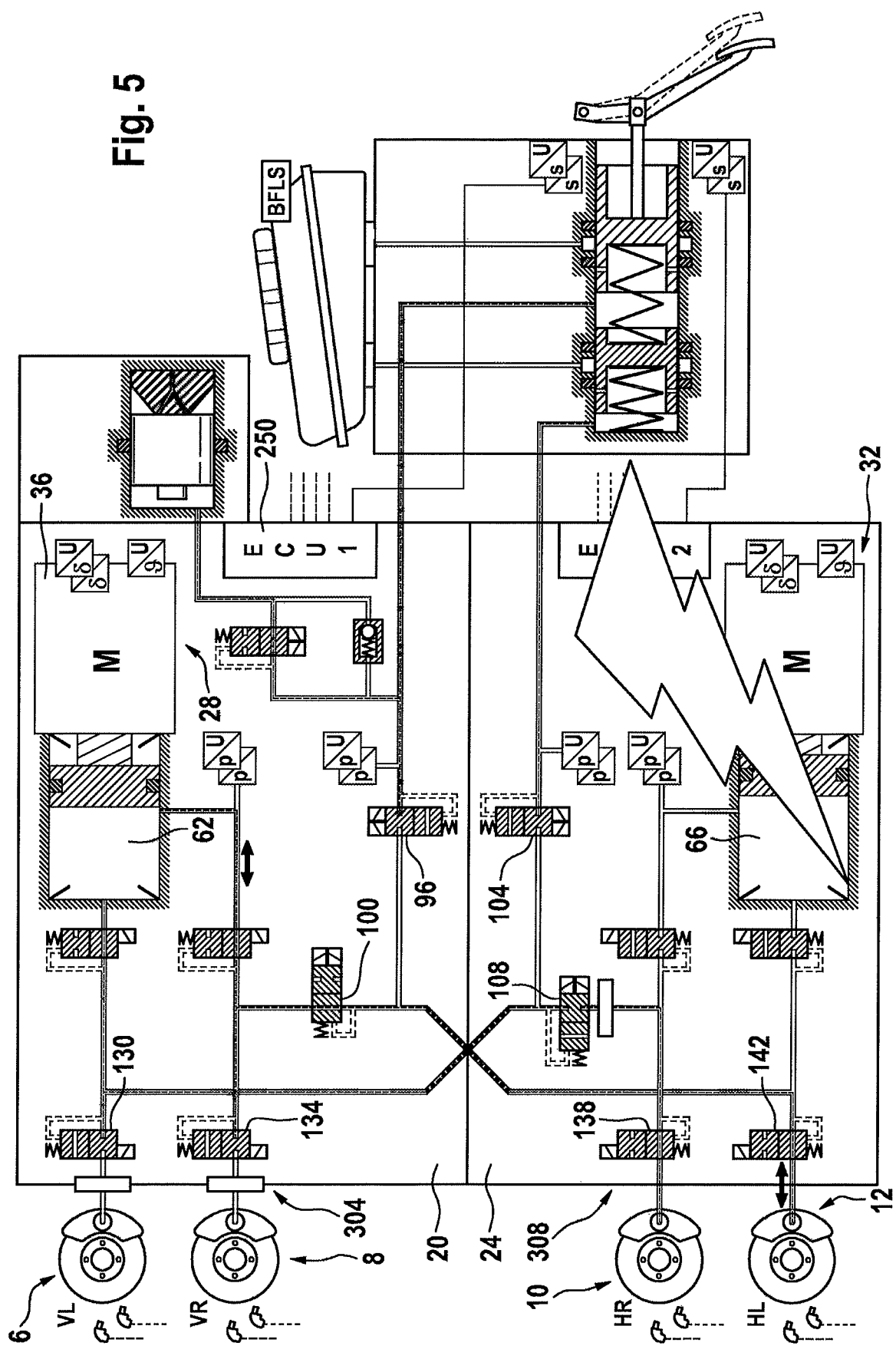
FIG. 5 shows the brake installation as per FIG. 2 in the first fall-back level during an exemplary wheel-specific brake pressure control operation.

As illustrated in FIG. 5, the intact pressure provision device 32 performs the pressure modulation for all four wheel brakes 6, 8, 10, 12. This operating mode constitutes a fall-back level, in which the pressure provision device 28 that remains intact performs wheel-specific brake pressure control with multiplex pressure control for all four wheel brakes 6, 8, 10, 12. Although such control does not attain the performance of the axle-by-axle multiplex control discussed above, it is however very highly suitable as a fall-back level. For this purpose, the module-specific wheel valves 130, 134 of the intact sub-module 20 are utilized to set the individual front-wheel pressures. In this operating mode, the isolating valves 100, 108 are utilized for the modulation of the rear-axle wheel brake pressures. Since said isolating valves are electrically switchable by both ECUs independently, said valves can, regardless of which sub-module 20, 24 fails, be switched by the ECU that remains intact. In the situation shown, said switching is thus performed by the open-loop and closed-loop control unit 250.

In the state of the brake installation 2 shown in FIG. 5, the wheel brakes 6 (front left), 8 (front right) and 10 (rear right) are hydraulically isolated from the pressure provision device 28 by the wheel valves 130, 134 and the isolating valve 108. Only the wheel brake 12 (rear left) is connected to the pressure chamber of the pressure provision device 28. In this switching configuration, the wheel brake pressure of the wheel brake 12 is set by the pressure provision device 28. After the target pressure has been attained in the wheel brake 12, said wheel brake is, in accordance with the multiplex method, isolated by closing the isolating valve 100, and the wheel brake with the next-highest priority is connected to the pressure chamber of the pressure provision device 28, such that the target pressure can be set at said wheel brake.

In this way, it is sequentially possible for wheel-specific brake pressures to be hydraulically set in all four wheel brakes 6, 8, 10, 12, and thus for wheel-specific brake control functions, such as for example ABS, to be performed. For suitable wheel slip control, use is made of the wheel rotational speed information items that are redundantly available. The described redundancy of the by-wire braking function and of the wheel-specific wheel brake pressure control also functions in analogously reversed fashion in the case of failure of the sub-module 20 with the intact sub-module 24.

By means of the redundant by-wire braking function and the redundant wheel-specific brake pressure control for all four wheel brakes 6, 8, 10, 12, the brake installation 2 is very highly suited to use for highly automated driving, because it provides the full scope of the required redundancy. The brake installation 2 can be easily connected to two independent energy supplies and to two or more independent communication connections.

Figure 6:
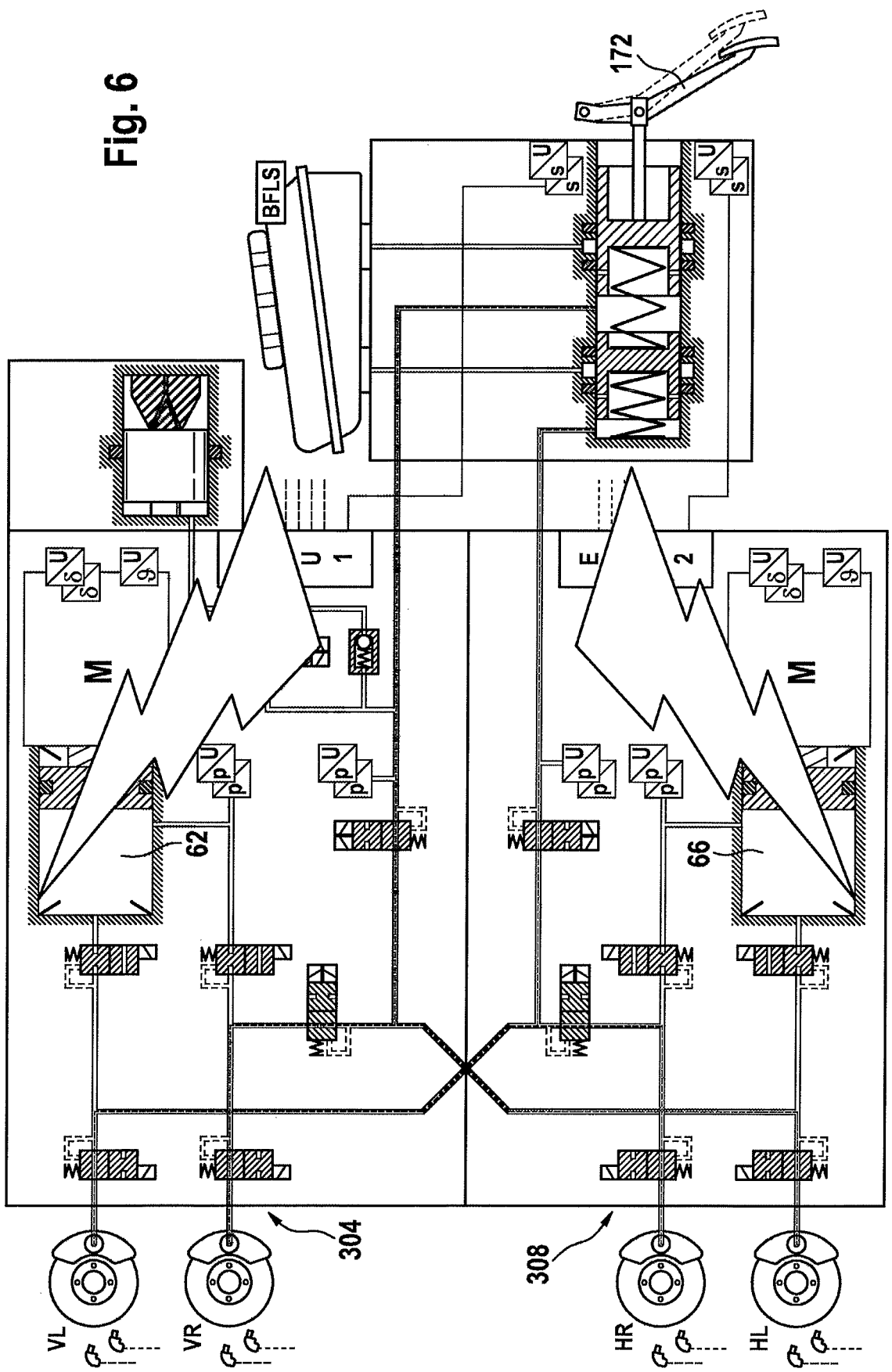
FIG. 6 shows the brake installation as per FIG. 2 in a second fall-back level in the event of failure of both of the pressure provision devices.

FIG. 6 illustrates the brake installation 2 in the hydraulic driver fall-back level, in the case of which all electromagnetic valves assume, as illustrated, their electrically deenergized switching position. In this configuration, the driver can, by actuating the brake pedal 172 or the master brake cylinder, directly hydraulically intervene in all four wheel brakes 6, 8, 10, 12. The brake circuit distribution in the fall-back level shown is diagonal. This may be advantageous in the event of a hydraulic leak. By contrast, as illustrated above, the by-wire operating mode has an axle-by-axle brake circuit distribution, which is advantageous for axle-by-axle pressure setting.

Thus, the brake installation 2 provides in each case an optimized brake circuit distribution for the normal operating mode and the fall-back levels, and in this way resolves the conflict of aims with regard to the brake circuit distribution. A further advantage of the brake system according to an aspect of the invention is that all components that are utilized in the fall-back levels are also utilized in the normal operating mode, whereby the requirements of ECE-R-13-H are met.

Figure 7:
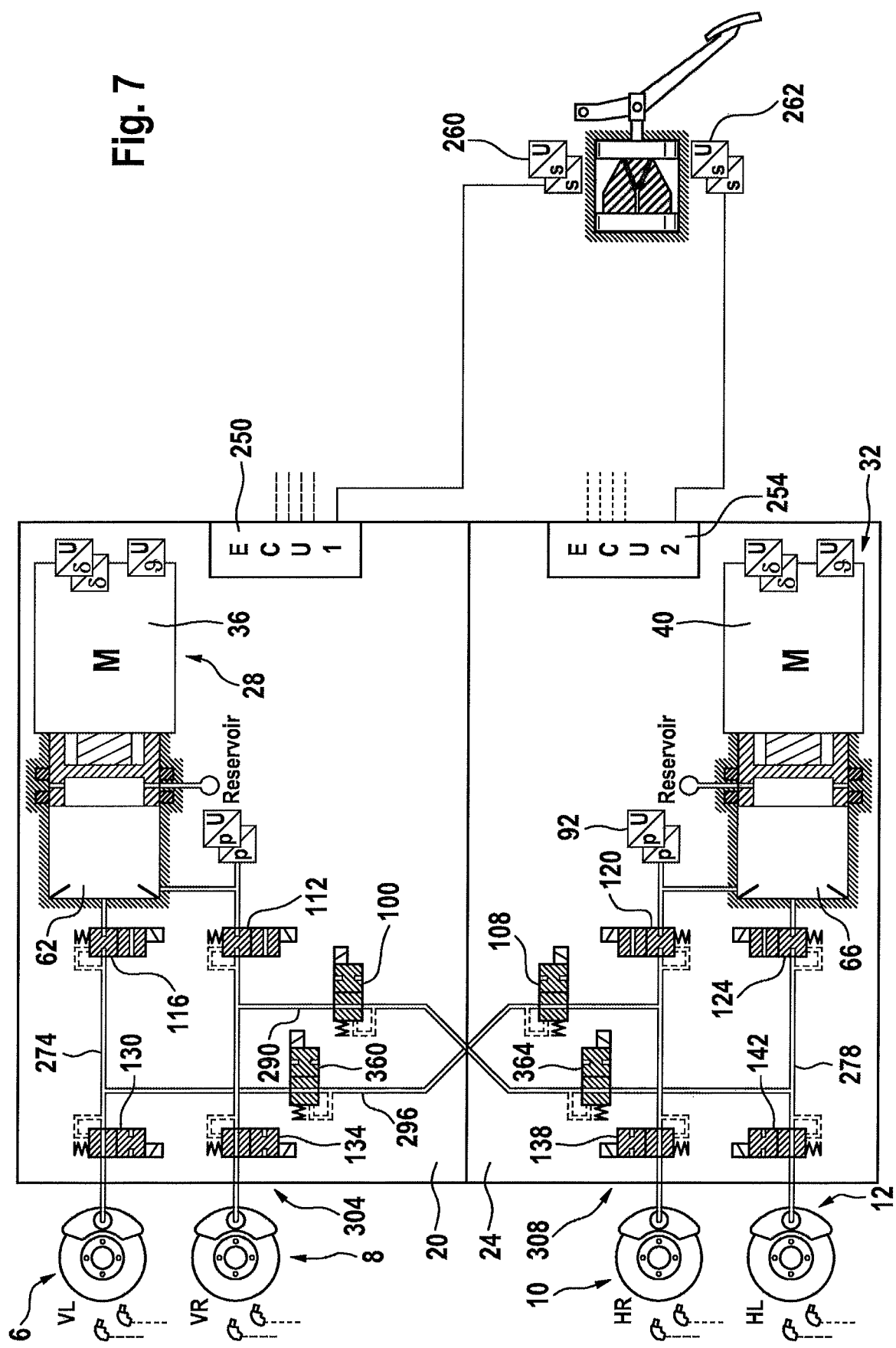
FIG. 7 shows a hydraulic circuit diagram of a brake installation having two pressure provision devices in a preferred embodiment, in the electrically deenergized state, without a hydraulic intervention facility.

Finally, FIG. 7 shows a brake installation 2 without hydraulic connection of a hydraulic master brake cylinder, in particular tandem master brake cylinder. That is to say, in a fall-back level, the driver does not build up brake pressure in the wheel brakes 6, 8, 10, 12 by muscle force. In order that, in the event of failure of one of the two pressure provision devices 28, 32, the remaining pressure provision device 28, 32 can still set pressure in all four wheel brakes 6, 8, 10, 12 in a wheel-specific manner, isolating valves 360, 364 are provided, which lead into in each case one connecting line from a wheel brake line of the sub-module 20 to a wheel brake line of the sub-module 24. The isolating valve 360 is in this case connected into the line 296, whereas the isolating valve 364 is connected into the line 290.

The invention claimed is:

1. A brake installation for a motor vehicle, having four hydraulic wheel brakes which are assigned in each case to one vehicle wheel, comprising:
   a brake pedal, which is assigned a travel sensor arrangement for identifying a braking demand, and having a first and a second pressure provision device for building up brake pressure in the wheel brakes,
   wherein the first pressure provision device is hydraulically connected via a first wheel brake line to a first wheel brake of the four hydraulic wheel brakes assigned to a first brake circuit and is hydraulically connected via a second wheel brake line to a second wheel brake of the four hydraulic wheel brakes assigned to the first brake circuit, and wherein the second pressure provision device is hydraulically connected via a third wheel brake line to a third wheel brake of the four hydraulic wheel brakes assigned to a second brake circuit and is hydraulically connected via a fourth wheel brake line to a fourth wheel brake of the four hydraulic wheel brakes assigned to the second brake circuit, wherein each of the first and second pressure provision devices is respectively activated by a separate respective open-loop and closed-loop control unit,
   a first hydraulic connecting line, into which an isolating valve which is open when electrically deenergized is connected, connects one of the first and second wheel brake lines of the first brake circuit to one of the third and fourth wheel brake lines of the second brake circuit, and
   a second hydraulic connecting line, into which an isolating valve which is open when electrically deenergized is connected, connects another one of the first and second wheel brake lines of the first brake circuit to another one of the third and fourth wheel brake lines of the second brake circuit,
   wherein when each of the isolating valves are closed, each of the first and second pressure provision devices is capable of building up pressure in the wheel brakes of only one brake circuit.

2. The brake installation as claimed in claim 1, wherein, in a normal operating mode, in which the first and second pressure provision devices build up brake pressure, at least one of the separate respective open-loop and closed-loop control units switches the isolating valves into their isolating position, such that in each case one of the first and second pressure provision devices builds up the pressure in the wheel brakes of the only one brake circuit.

3. The brake installation as claimed in claim 1, wherein one wheel valve, which is open when electrically deenergized, is connected into the respective wheel brake line, which wheel valve is opened by at least one of the separate respective open-loop and closed-loop control units for the purposes of a wheel-specific build-up of pressure in the respective wheel brake.

4. The brake installation as claimed in claim 1, wherein one sequence valve which is closed when electrically deenergized is connected into each of the first, second, third and fourth wheel brake lines.

5. The brake installation as claimed in claim 4, wherein, in the event of a failure of one of the first and second pressure provision devices, the sequence valves in the wheel brake lines by which the failed pressure provision device is connected to the wheel brakes switch, in an electrically deenergized state, into their isolating position.

6. The brake installation as claimed in claim 1, wherein each of the first and second pressure provision devices has exactly one pressure space and one piston which is movable into said pressure space for the purposes of building up pressure.

7. The brake installation as claimed in claim 1, wherein, in a normal operating mode, each of the first and second brake circuits is assigned two wheel brakes which impart a braking action on a same vehicle axle.

8. The brake installation as claimed in claim 1, wherein an actuation apparatus is provided which is hydraulically connectable to each of the four hydraulic wheel brakes and by which the driver can build up pressure in the wheel brakes when he or she actuates the brake pedal by muscle force.

9. The brake installation as claimed in claim 8, wherein the actuation unit is formed as a tandem master brake cylinder.

10. The brake installation as claimed in claim 2, wherein one wheel valve, which is open when electrically deenergized, is connected into the respective wheel brake line, which wheel valve is opened by at least one of the separate respective open-loop and closed-loop control units for the purposes of a wheel-specific build-up of pressure in the respective wheel brake.

11. The brake installation as claimed in claim 1, wherein the first pressure provision device is connected to the wheel brakes of the second brake circuit solely by way of at least one of the first and second hydraulic connecting lines, and the second pressure provision device is connected to the wheel brakes of the first brake circuit solely by way of at least one of the first and second hydraulic connecting lines.

12. A brake installation for a motor vehicle, having four hydraulic wheel brakes which are assigned in each case to one vehicle wheel, comprising:
a brake pedal, which is assigned a travel sensor arrangement for identifying a braking demand, and having a first and a second pressure provision device for building up brake pressure in the wheel brakes,
wherein the first pressure provision device is hydraulically connected via a first wheel brake line to a first wheel brake of the four hydraulic wheel brakes assigned to a first brake circuit and is hydraulically connected via a second wheel brake line to a second wheel brake of the four hydraulic wheel brakes assigned to the first brake circuit, and wherein the second pressure provision device is hydraulically connected via a third wheel brake line to a third wheel brake of the four hydraulic wheel brakes assigned to a second brake circuit and is hydraulically connected via a fourth wheel brake line to a fourth wheel brake of the four hydraulic wheel brakes assigned to the second brake circuit, wherein each of the first and second pressure provision devices is respectively activated by an open-loop and closed-loop control unit,
a first hydraulic connecting line, into which an isolating valve which is open when electrically deenergized is connected, connects one of the first and second wheel brake lines of the first brake circuit to one of the third and fourth wheel brake lines of the second brake circuit, and
a second hydraulic connecting line, into which an isolating valve which is open when electrically deenergized is connected, connects another one of the first and second wheel brake lines of the first brake circuit to another one of the third and fourth wheel brake lines of the second brake circuit,
wherein the respective pressure provision device has two pressure chambers, wherein each of the two pressure chambers is hydraulically connected or connectable to a different brake of the same brake circuit.

13. A method for operating a brake installation for a motor vehicle, having four hydraulic wheel brakes which are assigned in each case to one vehicle wheel,
having a brake pedal which is assigned a travel sensor arrangement for identifying a braking demand,
and having a first and a second pressure provision device for building up brake pressure in the wheel brakes,
wherein the first pressure provision device is hydraulically connected via a wheel brake line to a first wheel brake of the four hydraulic wheel brakes assigned to a first brake circuit and is hydraulically connected via a wheel brake line to a second wheel brake of the four hydraulic wheel brakes assigned to the first brake circuit, and wherein the second pressure provision device is hydraulically connected via a wheel brake line to a third wheel brake of the four hydraulic wheel brakes assigned to a second brake circuit and is hydraulically connected via a wheel brake line to a fourth wheel brake of the four hydraulic wheel brakes assigned to the second brake circuit,
and wherein each of the first and second pressure provision devices is respectively activated by a separate respective open-loop and closed-loop control unit,
a first hydraulic connecting line, into which an isolating valve which is open when electrically deenergized is connected, connects one of the wheel brake lines of the first brake circuit to one of the wheel brake lines of the second brake circuit, and
a second hydraulic connecting line, into which an isolating valve which is open when electrically deenergized is connected, connects another one of the wheel brake lines of the first brake circuit to another one of the wheel brake lines of the second brake circuit,
wherein, in a normal situation, when each of the isolating valves are closed and pressure can be built up by both pressure provision devices, building up pressure in the wheel brakes of only the first brake circuit with exactly one pressure provision device, and building up pressure in the wheel brakes of only the second brake circuit only by the other pressure provision device.

14. The method as claimed in claim 13, wherein, in the event of failure of exactly one of the first and second pressure provision devices, isolating said pressure provision device from the wheel brakes in which it builds up pressure in the normal situation, and wherein a connection is hydraulically produced between at least one of the first, second, third, and fourth wheel brake lines which is connected to the pressure provision device that has not failed and a wheel brake isolated with respect to the pressure provision device, such that the pressure provision device that remains functional can build up pressure in said wheel brakes.

15. The method as claimed in claim 13, wherein, in the event of failure of both of the first and second pressure provision devices, both of the first and second pressure provision devices are in each case hydraulically isolated from the four hydraulic wheel brakes, and wherein, in this case, an actuation unit actuatable by means of a brake pedal is hydraulically connected to the four hydraulic wheel brakes, with the aid of which actuation unit the driver can displace brake fluid into the four hydraulic wheel brakes by actuating the brake pedal.

16. The method as claimed in claim 14, wherein, in the event of failure of both of the first and second pressure provision devices, both of the first and second pressure provision devices are in each case hydraulically isolated from the four hydraulic wheel brakes, and wherein, in this case, an actuation unit actuatable by means of a brake pedal is hydraulically connected to the four hydraulic wheel brakes, with the aid of which actuation unit the driver can displace brake fluid into the four hydraulic wheel brakes by actuating the brake pedal.

\* \* \* \* \*